United States Patent
Testa et al.

(10) Patent No.: US 7,599,287 B2
(45) Date of Patent: Oct. 6, 2009

(54) TOKENS IN TOKEN BUCKETS MAINTAINED AMONG PRIMARY AND SECONDARY STORAGES

(75) Inventors: James Fraser Testa, Palo Alto, CA (US); Eyal Oren, Raanana (IL); Earl T. Cohen, Oakland, CA (US)

(73) Assignee: Cisco Technology, Inc.

( * ) Notice: Subject to any disclaimer, the term of this patent is extended or adjusted under 35 U.S.C. 154(b) by 754 days.

(21) Appl. No.: 11/271,247

(22) Filed: Nov. 11, 2005

(65) Prior Publication Data

US 2006/0062144 A1 Mar. 23, 2006

Related U.S. Application Data

(63) Continuation-in-part of application No. 10/295,181, filed on Nov. 15, 2002, now Pat. No. 7,304,942.

(51) Int. Cl.
  *H04L 12/56* (2006.01)
(52) U.S. Cl. ........................ 370/229; 370/389
(58) Field of Classification Search ............ 370/229, 370/230, 252
  See application file for complete search history.

(56) References Cited

U.S. PATENT DOCUMENTS

| | | | |
|---|---|---|---|
| 4,733,390 A | 3/1988 | Shirakawa et al. |
| 5,289,517 A | 2/1994 | Ohba et al. |
| 5,463,620 A | 10/1995 | Sriram |
| 5,953,338 A | 9/1999 | Ma et al. |
| 6,067,301 A | 5/2000 | Aatresh |
| 6,144,662 A | 11/2000 | Colmant et al. |
| 6,154,829 A | 11/2000 | Mino et al. |
| 6,625,266 B1 | 9/2003 | Saari et al. |
| 6,678,248 B1 | 1/2004 | Haddock et al. |
| 6,856,257 B1 | 2/2005 | Van Heteren |
| 6,925,055 B1 * | 8/2005 | Erimli et al. ............. 370/229 |

(Continued)

OTHER PUBLICATIONS

Ramabhadran, S. and Varghese, G. 2003. Efficient implementation of a statistics counter architecture. In Proceedings of the 2003 ACM SIGMETRICS international Conference on Measurement and Modeling of Computer Systems (San Diego, CA, USA, Jun. 11-14, 2003). SIGMETRICS '03. ACM Press, New York, NY, 261-271.

(Continued)

*Primary Examiner*—Min Jung
(74) *Attorney, Agent, or Firm*—The Law Office of Kirk D. Williams

(57) ABSTRACT

Token buckets are used in a computer or communications system for controlling rates at which corresponding items are processed. The number of tokens in a token bucket identifies the amount of processing that is available for the corresponding item. Instead of storing the value of a token bucket as a single value in a single memory location as traditionally done, the value of a token bucket is stored across multiple storage locations, such as in on-chip storage and in off-chip storage (e.g., in a memory device). An indication (e.g., one or more bits) can also be stored on chip to identify whether or not the off-chip stored value is zero and/or of at least of a certain magnitude such that it may be readily determined whether there are sufficient tokens to process an item without accessing the off-chip storage.

31 Claims, 12 Drawing Sheets

U.S. PATENT DOCUMENTS

| | | | |
|---|---|---|---|
| 7,203,963 B1 * | 4/2007 | Wu et al. | 726/23 |
| 7,304,942 B1 | 12/2007 | Malladi et al. | |
| 7,350,208 B1 * | 3/2008 | Shoham | 718/102 |
| 2001/0033581 A1 | 10/2001 | Kawarai et al. | |
| 2002/0180540 A1 | 12/2002 | Hirai | |
| 2003/0069970 A1 * | 4/2003 | Kim et al. | 709/225 |
| 2003/0152084 A1 | 8/2003 | Lee et al. | |
| 2005/0157723 A1 * | 7/2005 | Kim et al. | 370/392 |
| 2006/0077904 A1 * | 4/2006 | Brandenburg et al. | 370/252 |
| 2006/0133279 A1 | 6/2006 | Le Faucher et al. | |
| 2007/0171824 A1 | 7/2007 | Ruello et al. | |
| 2008/0025214 A1 | 1/2008 | Bettink et al. | |

OTHER PUBLICATIONS

"Modular QoS CLI (MQC) Three-Level Hierarchical Policer", Cisco Systems, Inc., San Jose, CA, Oct. 1, 2004.

Shah et al., "Maintaining Statistics Counters in Router Line Cards," IEEE Micro, Jan. -Feb. 2002, pp. 76-81.

Heinanen et al., "A Single Rate Three Color Marker," RFC 2697, IETF, Sep. 1999.

Heinanen et al., "A Two Rate Three Color Marker," RFC 2698, IETF Sep. 1999.

* cited by examiner

TOKENS IN TOKEN BUCKETS MAINTAINED AMONG PRIMARY AND SECONDARY STORAGES

CROSS-REFERENCE TO RELATED APPLICATIONS

This is a continuation-in-part of application Ser. No. 10/295,181, filed Nov. 15, 2002, now U.S. Pat. No. 7,304,942 which is hereby incorporated by reference in its entirety.

TECHNICAL FIELD

One embodiment of the invention relates to communications and computer systems, especially routers, packet switching systems, and other devices; and more particularly, one embodiment relates to maintaining and using token buckets, wherein the tokens in a token bucket are maintained among primary storage and secondary storage, and optionally with an indication reflective of the tokens in the secondary storage (and thus an overall minimum number of tokens in the token bucket) maintained in the primary storage, such that often the eligibility of an item corresponding to the token bucket can be determined based on the values stored in the primary storage without having to access the secondary storage.

BACKGROUND

The communications industry is rapidly changing to adjust to emerging technologies and ever increasing customer demand. This customer demand for new applications and increased performance of existing applications is driving communications network and system providers to employ networks and systems having greater speed and capacity (e.g., greater bandwidth). In trying to achieve these goals, a common approach taken by many communications providers is to use packet switching technology. Increasingly, public and private communications networks are being built and expanded using various packet technologies, such as Internet Protocol (IP). Note, nothing described or referenced in this document is admitted as prior art to this application unless explicitly so stated.

Token buckets are used in a computer or communications system for controlling rates at which corresponding items are processed (e.g., number of bytes of packets sent, processing time of computer processes, etc.). The number of tokens in a token bucket identifies the amount of processing that is available for the corresponding item. If a token bucket does not have enough tokens needed for the requisite next processing of an item, an item is ineligible for processing. Thus, the processing of the item may be forgone (e.g., packet(s) dropped) or delayed at least until the token bucket acquires enough tokens. Tokens are typically added periodically.

Prior known systems typically use a single memory location for storing the entire number of tokens in a token bucket, with this memory location residing on or off the processing chip. Systems using a large number of token buckets require a proportionally large memory space to store each of the token buckets, and thus typically use a memory device (e.g., RAM) external to the processing system. This can be problematic for high speed applications, in which the bandwidth required to access these memory locations is not available for the required high access rate, and thus, needed are new approaches for maintaining the tokens in token buckets.

A prior system maintains incrementing statistic counters according to the approach described in Srinivasa Rao Malladi and Earl T. Cohen, "Methods and Apparatus for Maintaining Statistic Counters and Updating a Secondary Counter Storage Via a Queue For Reducing or Eliminating Overflow of the Counters," U.S. patent application Ser. No. 10/295,181, filed Nov. 15, 2002, (hereinafter "Malladi et al."). The statistic counters used in the prior system only increase in value, and the approach implemented in this prior art system cannot be used for maintaining the number of tokens in a token bucket which can both increase and decrease in the value. This prior art system is believed to teach away from maintaining portions of a value among multiple storage locations with values that can be incremented and decremented by amounts corresponding to an amount of processing, as Malladi et al. provides no mechanism for performing such function and provides no rational for desiring to perform such function. Note, an embodiment of the invention described in Malladi et al. has been used in publicly disclosed and sold products for over a year prior to filing of this patent application.

SUMMARY

Disclosed are, inter alia, methods, apparatus, data structures, computer-readable media, mechanisms, and means for maintaining and using token buckets, wherein the tokens in a token bucket are maintained among one or more primary storages and one or more secondary storages. In one embodiment, one or more indications reflective of the tokens in the secondary storage are also maintained in the primary storage, such that these indications typically indicate whether or not the number of tokens in the secondary storage exceeds one or more threshold values (and thus, these indications are also reflective of the number of tokens in the token bucket). Based on the value in the primary storage and/or the indication of the tokens in the secondary storage, the eligibility of an item associated with the token bucket (also sometimes referred to as the eligibility of the token bucket itself) can often be readily determined without having to access the secondary storage. Thus, it is possible, for example, to have a smaller, on-chip primary storage memory and a larger external secondary storage memory, and/or for the primary storage(s) to be faster-access, higher-bandwidth, and/or lower-latency than that of the secondary storage(s). Of course, the number of embodiments is extensible, and is not limited to these exemplary memory configurations.

BRIEF DESCRIPTION OF THE DRAWINGS

The appended claims set forth the features of the invention with particularity. The invention, together with its advantages, may be best understood from the following detailed description taken in conjunction with the accompanying drawings of which:

DETAILED DESCRIPTION

Figure 1A:
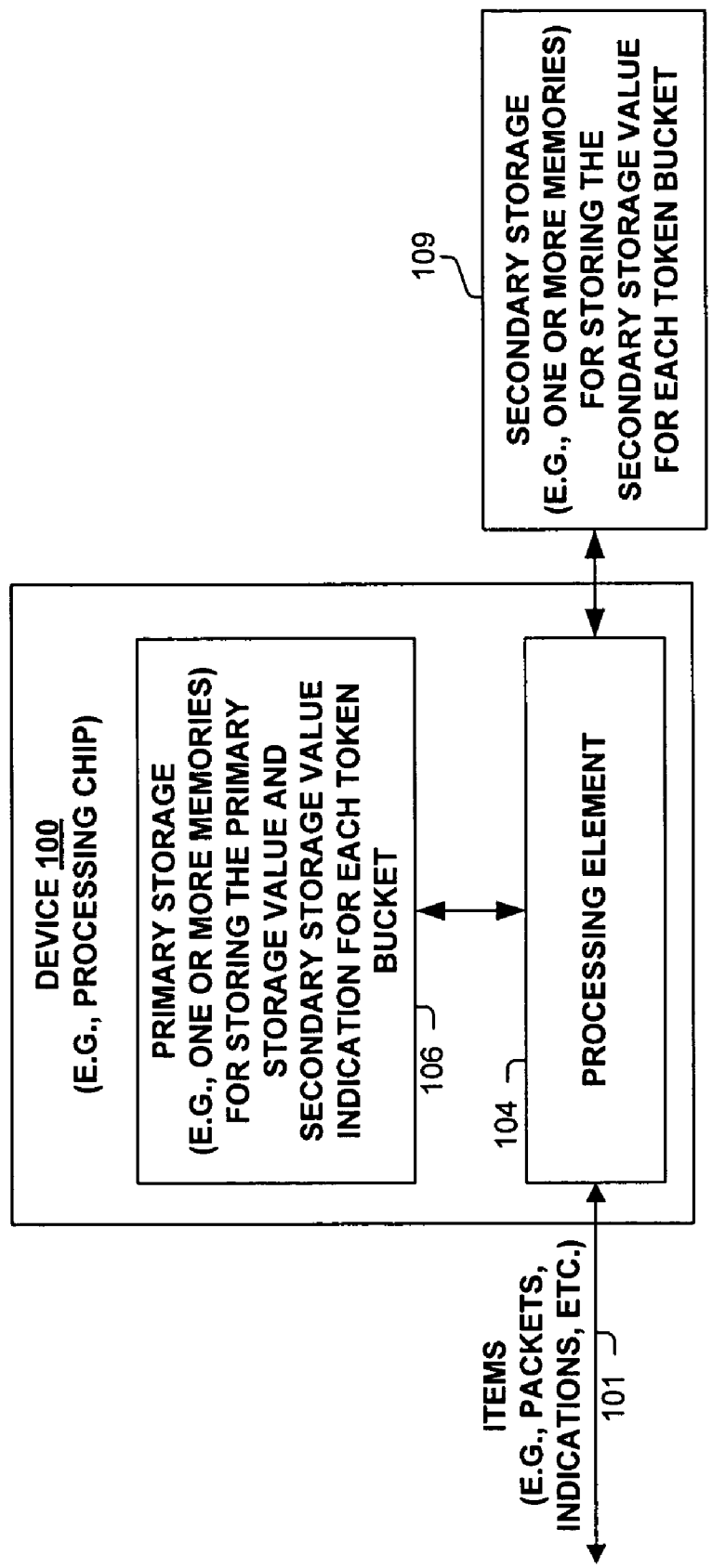
FIGS. 1A-E are block diagrams of a few of an unlimited number of embodiments for maintaining and using token buckets.

Disclosed are, inter alia, methods, apparatus, data structures, computer-readable media, mechanisms, and means for maintaining and using token buckets, wherein the tokens in a token bucket are maintained among primary storage and secondary storage.

Note, embodiments described herein include various elements and limitations, with no one element or limitation contemplated as being a critical element or limitation. Each of the claims individually recites an aspect of the invention in its entirety. Moreover, some embodiments described may include, but are not limited to, inter alia, systems, networks, integrated circuit chips, embedded processors, ASICs, methods, and computer-readable media containing instructions. One or multiple systems, devices, components, etc. may comprise one or more embodiments, which may include some elements or limitations of a claim being performed by the same or different systems, devices, components, etc. The embodiments described hereinafter embody various aspects and configurations within the scope and spirit of the invention, with the figures illustrating exemplary and non-limiting configurations. Note, computer-readable media and means for performing methods and processing block operations are disclosed and are in keeping with the extensible scope and spirit of the invention.

As used herein, the term "packet" refers to packets of all types or any other units of information or data, including, but not limited to, fixed length cells and variable length packets, each of which may or may not be divisible into smaller packets or cells. The term "packet" as used herein also refers to both the packet itself or a packet indication, such as, but not limited to all or part of a packet or packet header, a data structure value, pointer or index, or any other part or direct or indirect identification of a packet or information associated therewith. For example, often times a router operates on one or more fields of a packet, especially the header, so the body of the packet is often stored in a separate memory while the packet header is manipulated, and based on the results of the processing of the packet (i.e., the packet header in this example), the entire packet is forwarded or dropped, etc. Additionally, these packets may contain one or more types of information, including, but not limited to, voice, data, video, and audio information. The term "item" is used generically herein to refer to a packet or any other unit or piece of information or data, a device, component, element, or any other entity. The phrases "processing a packet" and "packet processing" typically refer to performing some steps or actions based on the packet contents (e.g., packet header or other fields), and such steps or action may or may not include modifying, storing, dropping, and/or forwarding the packet and/or associated data.

The term "system" is used generically herein to describe any number of components, elements, sub-systems, devices, packet switch elements, packet switches, routers, networks, computer and/or communication devices or mechanisms, or combinations of components thereof. The term "computer" is used generically herein to describe any number of computers, including, but not limited to personal computers, embedded processing elements and systems, control logic, ASICs, chips, workstations, mainframes, etc. The term "processing element" is used generically herein to describe any type of processing mechanism or device, such as a processor, ASIC, field programmable gate array, computer, etc. The term "device" is used generically herein to describe any type of mechanism, including a computer or system or component thereof. The terms "task" and "process" are used generically herein to describe any type of running program, including, but not limited to a computer process, task, thread, executing application, operating system, user process, device driver, native code, machine or other language, etc., and can be interactive and/or non-interactive, executing locally and/or remotely, executing in foreground and/or background, executing in the user and/or operating system address spaces, a routine of a library and/or standalone application, and is not limited to any particular memory partitioning technique. The steps, connections, and processing of signals and information illustrated in the figures, including, but not limited to any block and flow diagrams and message sequence charts, may typically be performed in the same or in a different serial or parallel ordering and/or by different components and/or processes, threads, etc., and/or over different connections and be combined with other functions in other embodiments, unless this disables the embodiment or a sequence is explicitly or implicitly required (e.g., for a sequence of read the value, process the value, the value must be obtained prior to processing it, although some of the associated processing may be performed prior to, concurrently with, and/or after the read operation). Furthermore, the term "identify" is used generically to describe any manner or mechanism for directly or indirectly ascertaining something, which may include, but is not limited to receiving, retrieving from memory, determining, defining, calculating, generating, etc.

Moreover, the terms "network" and "communications mechanism" are used generically herein to describe one or more networks, communications media or communications systems, including, but not limited to the Internet, private or public telephone, cellular, wireless, satellite, cable, local area, metropolitan area and/or wide area networks, a cable, electrical connection, bus, etc., and internal communications mechanisms such as message passing, interprocess communications, shared memory, etc. The term "message" is used generically herein to describe a piece of information which may or may not be, but is typically communicated via one or more communication mechanisms of any type.

The term "storage mechanism" includes any type of memory, storage device or other mechanism for maintaining instructions or data in any format. "Computer-readable medium" is an extensible term including any memory, storage device, storage mechanism, and other storage mechanisms. The term "memory" includes any random access memory (RAM), read only memory (ROM), flash memory, integrated circuits, and/or other memory components or elements. The term "storage device" includes any solid state storage media, disk drives, diskettes, networked services, tape drives, and other storage devices. Memories and storage devices may store computer-executable instructions to be executed by a processing element and/or control logic, and data which is manipulated by a processing element and/or control logic. The term "data structure" is an extensible term referring to any data element, variable, data structure, database, and/or one or more organizational schemes that can be applied to data to facilitate interpreting the data or performing operations on it, such as, but not limited to memory locations or devices, sets, queues, trees, heaps, lists, linked lists, arrays, tables, pointers, etc. A data structure is typically maintained in a storage mechanism. The terms "pointer" and "link" are used generically herein to identify some mechanism for referencing or identifying another element, component, or other entity, and these may include, but are not limited to a reference to a memory or other storage mechanism or location therein, an index in a data structure, a value, etc.

The term "one embodiment" is used herein to reference a particular embodiment, wherein each reference to "one embodiment" may refer to a different embodiment, and the use of the term repeatedly herein in describing associated features, elements and/or limitations does not establish a cumulative set of associated features, elements and/or limitations that each and every embodiment must include, although an embodiment typically may include all these features, elements and/or limitations. In addition, the phrase "means for xxx" typically includes computer-readable medium containing computer-executable instructions for performing xxx.

In addition, the terms "first," "second," etc. are typically used herein to denote different units (e.g., a first element, a second element). The use of these terms herein does not necessarily connote an ordering such as one unit or event occurring or coming before another, but rather provides a mechanism to distinguish between particular units. Additionally, the use of a singular tense of a noun is non-limiting, with its use typically including one or more of the particular thing rather than just one (e.g., the use of the word "memory" typically refers to one or more memories without having to specify "memory or memories," or "one or more memories" or "at least one memory", etc.). Moreover, the phrases "based on x" and "in response to x" are used to indicate a minimum set of items x from which something is derived or caused, wherein "x" is extensible and does not necessarily describe a complete list of items on which the operation is performed, etc. Additionally, the phrase "coupled to" is used to indicate some level of direct or indirect connection between two elements or devices, with the coupling device or devices modifying or not modifying the coupled signal or communicated information. The term "subset" is used to indicate a group of all or less than all of the elements of a set. The term "subtree" is used to indicate all or less than all of a tree. Moreover, the term "or" is used herein to identify a selection of one or more, including all, of the conjunctive items.

Token buckets are often used in a computer or communications system for controlling rates at which corresponding items are processed (e.g., the number of bytes of a packet currently permitted such as for rate-control applications, the number of processing cycles allowed for a thread, etc.) The number of tokens in a token bucket may identify, for example, an amount of processing that is available for the corresponding item. Instead of storing the value of a token bucket as a single value in a single memory location as traditionally done, the value of a token bucket may be stored across multiple storage locations, such as in on-chip storage and in off-chip storage (e.g., in a memory device). An indication (e.g., one or more bits) can also be stored on chip to identify whether or not the off-chip stored value is zero and/or of at least of a certain magnitude such that it typically may be readily determined whether there are sufficient tokens to process an item without accessing the off-chip storage.

One embodiment maintains a particular number of tokens in a token bucket for use in processing items. The particular number of tokens is stored among multiple different storages, including a primary storage and a secondary storage. The primary storage includes a primary storage token value, and the secondary storage includes a secondary storage token value. The particular number of tokens includes the primary storage token value plus the secondary storage token value. One embodiment identifies that the particular number of tokens is sufficient to process a first item of said items without accessing the secondary storage token value, adjusts the particular number of tokens by modifying the primary storage token value and not accessing the secondary storage token value, wherein modifying the primary storage token value includes adjusting the primary storage token value by an amount corresponding to the tokens required to process the first item.

One embodiment identifies that the particular number of tokens is sufficient to process a second item of said items, and updates the particular number of tokens by changing both the primary storage token value and the secondary storage token value. This changing includes reading and summing the current values of both the primary storage token value and the secondary storage token value and adjusting by an amount corresponding to the tokens required to process the second item, and redistributing the number of tokens in the token bucket among the plurality of different storages. This redistributing includes storing values in both the primary storage token value and the secondary storage token value. In one embodiment, the redistributing causes a smaller value to be stored in the secondary storage token value than the current value read from the secondary storage token value as part of the same update operation as the redistributing operation. In one embodiment, the resulting number of tokens currently in the token bucket after the update operation is the sum of values stored in the primary storage token value and the secondary storage token value. In one embodiment, the secondary storage includes all plus at least one more bit positions of the primary storage. In one embodiment, the redistributing operation centers the number of tokens stored in the primary storage token value. In one embodiment, the secondary storage includes all plus at least one more bit positions of the primary storage. In one embodiment, the primary storage includes a secondary storage indication reflecting a current number of tokens in the secondary storage token value; and wherein identifying that the particular number of tokens is sufficient to process the first item of said items includes accessing the secondary storage indication.

One embodiment includes a first device and a secondary storage. The first device is configured to process items according to a number of tokens in a token bucket and to update the number of tokens in the token bucket. The first device includes a primary storage, with the primary storage including a primary storage value representing a first quantity of the number of tokens. The secondary storage is communicatively coupled to the first device and external to the first device. The secondary storage includes a secondary storage value representing a second quantity of the number of tokens. The number of tokens in the token bucket is represented by an aggregation of quantities of tokens, with these quantities of tokens including the first quantity and the second quantity. The first device is configured to maintain a secondary storage value indication representative of the second quantity of the number of tokens such that the first device can identify without accessing the secondary storage value and based on the primary storage value and the secondary storage value indication whether or not the number of tokens is sufficient to process a next item of said items.

In one embodiment, the secondary storage value indication consists of one bit. In one embodiment, this one bit is in a first state for indicating that the secondary storage value is zero and in a second state for indicating that the secondary storage value is not zero. In one embodiment, this bit is in a first state for indicating that the secondary storage value is at least a predetermined value greater than zero and in a second state for indicating that the secondary storage value is not at least the predetermined value. In one embodiment, the number of tokens is equal to the sum of the first quantity and the second quantity. In one embodiment, updating the number of tokens in the token bucket includes distributing the number of tokens in the token bucket to the first and second quantities. In one embodiment, the operation of distributing the number of tokens includes increasing by a particular number of tokens the number of tokens in the first quantity and decreasing by the particular number of tokens the number of tokens in the second quantity. In one embodiment, updating the number of tokens in the token bucket includes: flushing an indication of the token bucket into an update queue; and subsequently to said flushing operation: identifying said queued indication as being ready to process, and in response to said identified queued indication, updating the second quantity. In one embodiment, in response to the identified queued indication, the secondary storage value indication is updated to reflect said updated second quantity. In one embodiment, the queued indication includes a third quantity of tokens; and wherein said quantities of tokens includes the third quantity of tokens. In one embodiment, a current value of the primary storage value is a negative number. In one embodiment, the first device is configured to identify that number of tokens is sufficient to process a next item of said items based on the secondary storage value indication even though the primary storage value is a negative number.

One embodiment includes a first device and a secondary storage. The first device is configured to process items according to a number of tokens in a token bucket and to update the number of tokens in the token bucket. The first device includes a primary storage, with the primary storage including a primary storage value representing a first quantity of the number of tokens. The secondary storage is communicatively coupled to the first device and external to the first device. The secondary storage includes a secondary storage value representing a second quantity of the number of tokens. The first device is configured to maintain a secondary storage value indication representative of the second quantity of the number of tokens such that the first device can identify without accessing the secondary storage value and based on the secondary storage value indication whether or not the number of tokens is sufficient to process a next item of said items. The secondary storage value indication consists of one bit; and wherein this bit is in a first state for indicating that the secondary storage value is at least a predetermined value greater than zero and in a second state for indicating that the secondary storage value is not at least the predetermined value.

One embodiment for forwarding packets based on token buckets includes identifying a packet to be sent, determining a new number of tokens for the corresponding token bucket, and updating at least the first value associated with the token bucket corresponding to the identified packet based on a new number of tokens. The identified packet is associated with a corresponding token bucket of multiple token buckets. The number of tokens within each particular token bucket of these token buckets is distributed between multiple storage locations, which includes a first value stored in a primary storage and a second value stored in a secondary storage. A packet is eligible to be sent if the number of tokens within its corresponding token bucket contains enough tokens to send the packet associated therewith. The determination of the new number of tokens for the corresponding token bucket includes decreasing the corresponding token bucket by an amount corresponding to the identified packet.

In one embodiment, each particular token bucket of the token buckets is further associated with a secondary storage indication of whether or not its said corresponding second value currently has a value larger than or at least as large as a predetermined value greater than zero; and wherein the operation of identifying the packet includes referencing its corresponding said secondary storage indication. In one embodiment, the operation of identifying the packet does not reference the second value. In one embodiment, the first value is a signed value for identifying a value with a range of possible values including a negative, zero, or positive number. In one embodiment, the first and second values for each of the token buckets each include a multiple bits to represent their respective values with at least one overlapping bit; wherein two bits overlap if their positions represent the same power of two. In one embodiment, the second value includes all plus at least one more bit positions of the first value. In one embodiment, the primary storage and the secondary storage are on different computer chips.

One embodiment for forwarding packets based on token buckets includes a secondary storage device, a token bucket manipulation mechanism, and means for updating at least a first value associated with a token bucket corresponding to a packet based on the new number of tokens. The token bucket manipulation includes: primary storage and means for determining a new number of tokens for a token bucket corresponding to an identified eligible packet. The identified eligible packet is associated with a corresponding token bucket. The number of tokens within the corresponding token bucket is distributed between the secondary storage device and the primary storage, with a first value of tokens of the corresponding token bucket in the primary storage and a second value of tokens of the corresponding token bucket in the secondary storage device. The identified eligible packet was determined to be eligible because the corresponding token bucket contains enough tokens to send the identified eligible packet.

In one embodiment, the token bucket corresponding to the identified eligible packet is further associated with a secondary storage indication maintained in the primary storage. The secondary storage indication indicates whether or not its said corresponding second value currently has a value larger than or at least as large as a predetermined value greater than zero; and the identified eligible packet is determined to be eligible based on referencing the secondary storage indication. In one embodiment, the identified eligible packet was determined to be eligible without referencing the second value.

Turning to the figures, FIG. 1A illustrates a device 100, such as, but not limited to, a chip for processing packet or performing other tasks. Device 100, as shown, includes processing element 104 and primary storage 106 (e.g., one or more memories or other computer-readable media). External to device 100 is secondary storage 109, such as, but not limited to, a memory chip or device commonly used in a computer or communications system. Primary storage 106 is used to store the primary storage values representing a first quantity of the number of tokens in the token bucket. Secondary storage 109 is used to store the secondary storage values representing a secondary quantity of the number of tokens in the token bucket. Note, in one embodiment, secondary storage 109 includes more than one memory or other media, and may include more than one secondary storage value of a particular token bucket. Primary storage 106 may be used to also store a secondary storage value indication for each of the token buckets, with this secondary storage value representing the quantity of tokens stored in the secondary storage for the token bucket, such that it can be often be determined whether or not there are enough tokens to perform the desired processing without having to access secondary storage 109.

Figure 1B:
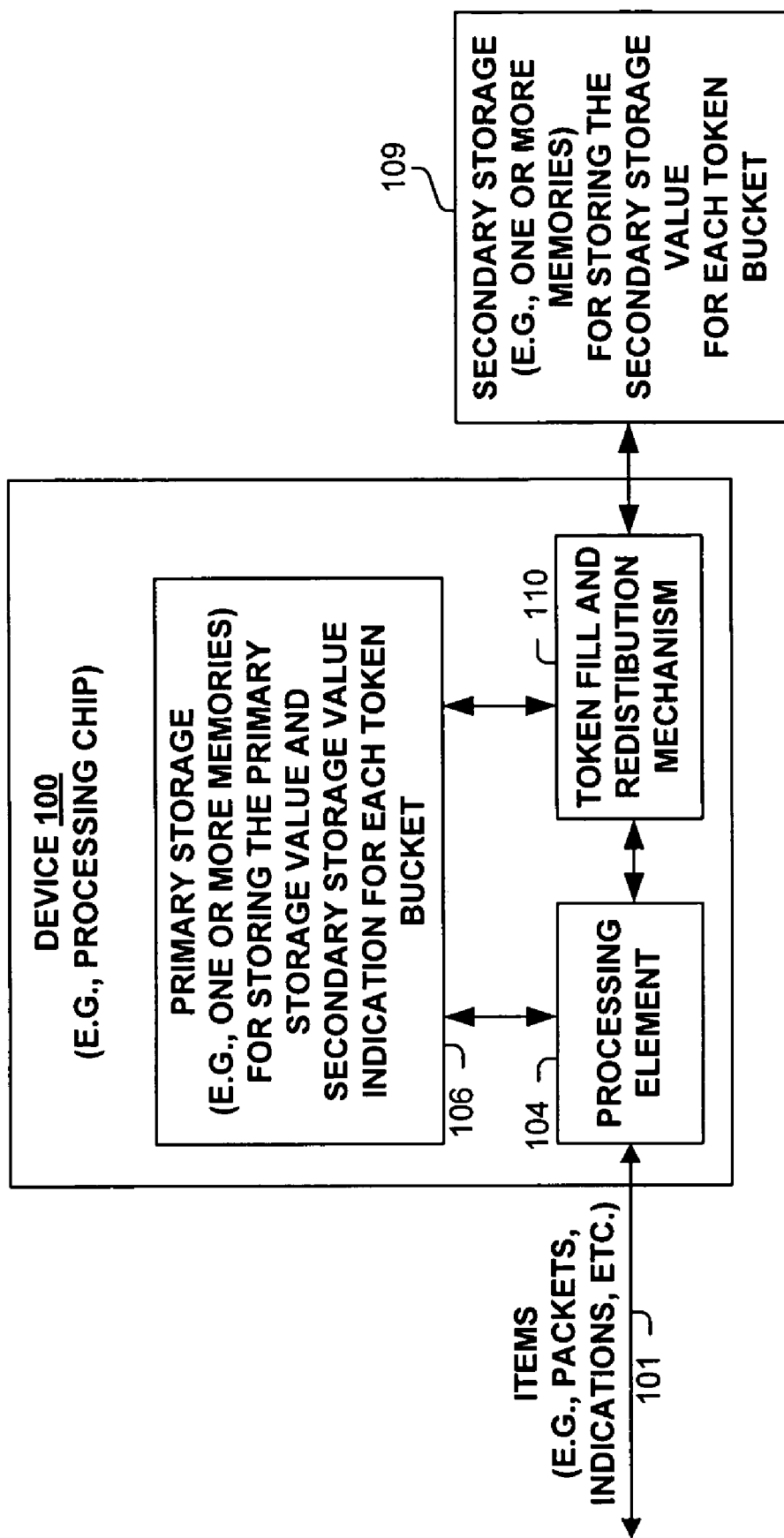

In one embodiment, the number of tokens in a token bucket is the sum of the primary and secondary storage values corresponding to that token bucket. In one embodiment, the tokens in the primary storage are a subset of those in the secondary storage. In one embodiment, some of the tokens in the token bucket may be stored elsewhere, such as in an update queue awaiting for updating one or more of these quantities and possibly redistributing the tokens among these quantities. In one embodiment, device 100 corresponds to a packet processor, which sends and receives packets (101) according to the number of tokens in token buckets, with these tokens being distributed between primary storage 106 and secondary storage 109. For example, FIG. 1B illustrates device 100 including token fill and redistribution mechanism 110, which may include memory/queues for storing indications of token buckets, and possibly specific values, of token buckets which need updating and/or desire their tokens to be redistributed between their primary and secondary values. In which case, token fill and redistribution mechanism 110 typically will do a read, modify, write operation on the secondary and/or primary storage values of a token bucket, and possibly update the secondary storage value indication accordingly. In some systems, such as that shown in FIG. 1A, processing element 104 performs the redistribution function itself.

In one embodiment, the mechanism for performing the token redistribution includes a queue of indications of token buckets awaiting for their redistribution. In one embodiment, no tokens are included in the entries of the redistribution queue, but rather identifiers of the token buckets to be redistributed are included in the queue. Upon processing of a particular identifier, the redistribution process reads the primary and secondary storage values and redistributes the tokens accordingly. In one embodiment, a number of tokens along with an identifier of the token bucket is included in the queue (and thus the number of tokens in the token bucket includes the tokens in the primary and secondary storages and the queue). Upon processing of a particular identifier, the redistribution process reads the primary and/or secondary storage values and updates these value(s) accordingly. In one embodiment, the processing includes the periodic update of the number of tokens, which may be based on the amount of time elapsed since the last such periodic update. In one embodiment, a mechanism (e.g., an associative memory or other lookup mechanism and/or data structure) is included with the queue to ensure that two entries for the same token bucket are not included in the queue at a same time. In one embodiment wherein a number of tokens is not included in the queue, then an identifier of a token bucket is only added to the queue if no identifier for the same token bucket is already in the queue. In one embodiment wherein a number of tokens is included in the queue, then if an identifier for the same token bucket is already in the queue, its corresponding number of tokens is updated.

Figure 1C:
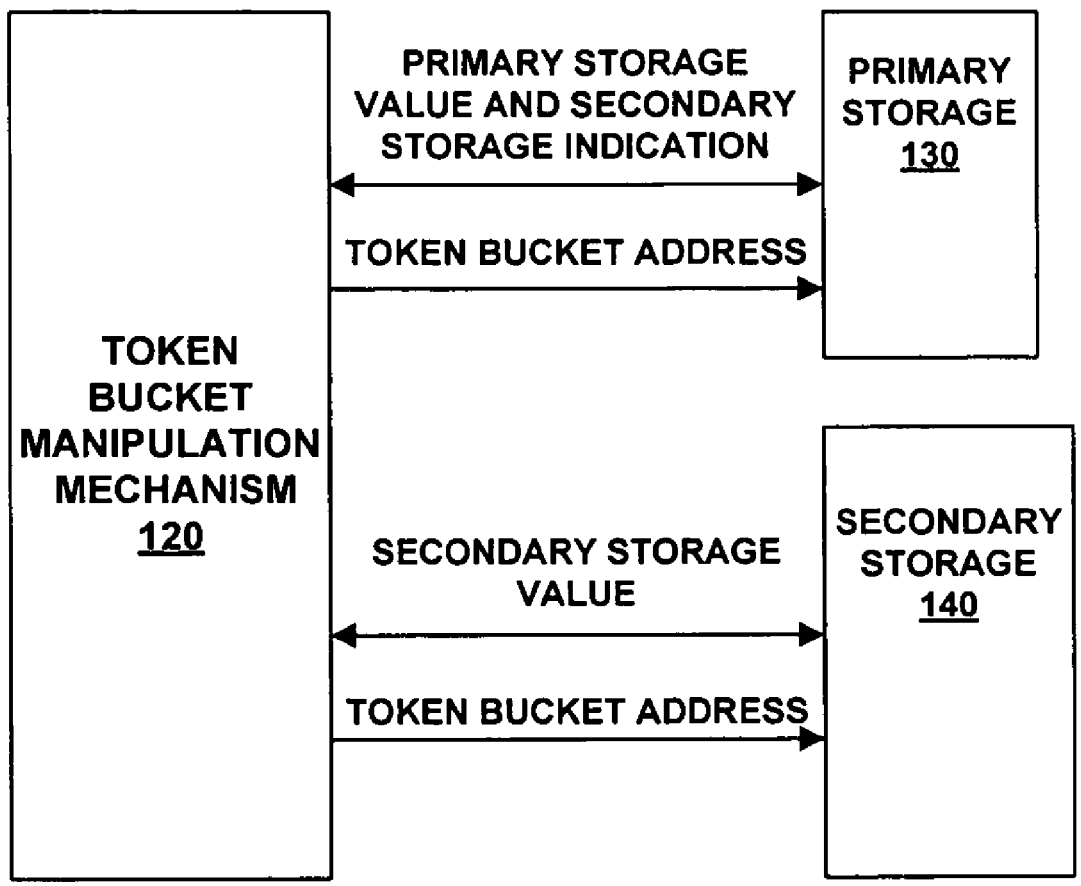

FIG. 1C is a block diagram illustrating a token bucket manipulation mechanism 120, which uses primary storage 130 and secondary storage 140 for maintaining the token buckets. In one embodiment, primary storage 130 is used to store the primary storage value (e.g., a first quantity of tokens) and the secondary storage value indication, and secondary storage 140 is used to store the secondary storage value (e.g., a second quantity of tokens). In one embodiment, primary storage 130 is used to store the primary storage value (e.g., a first quantity of tokens) without a secondary storage value indication, and secondary storage 140 is used to store the secondary storage value (e.g., a second quantity of tokens).

Figure 1D:
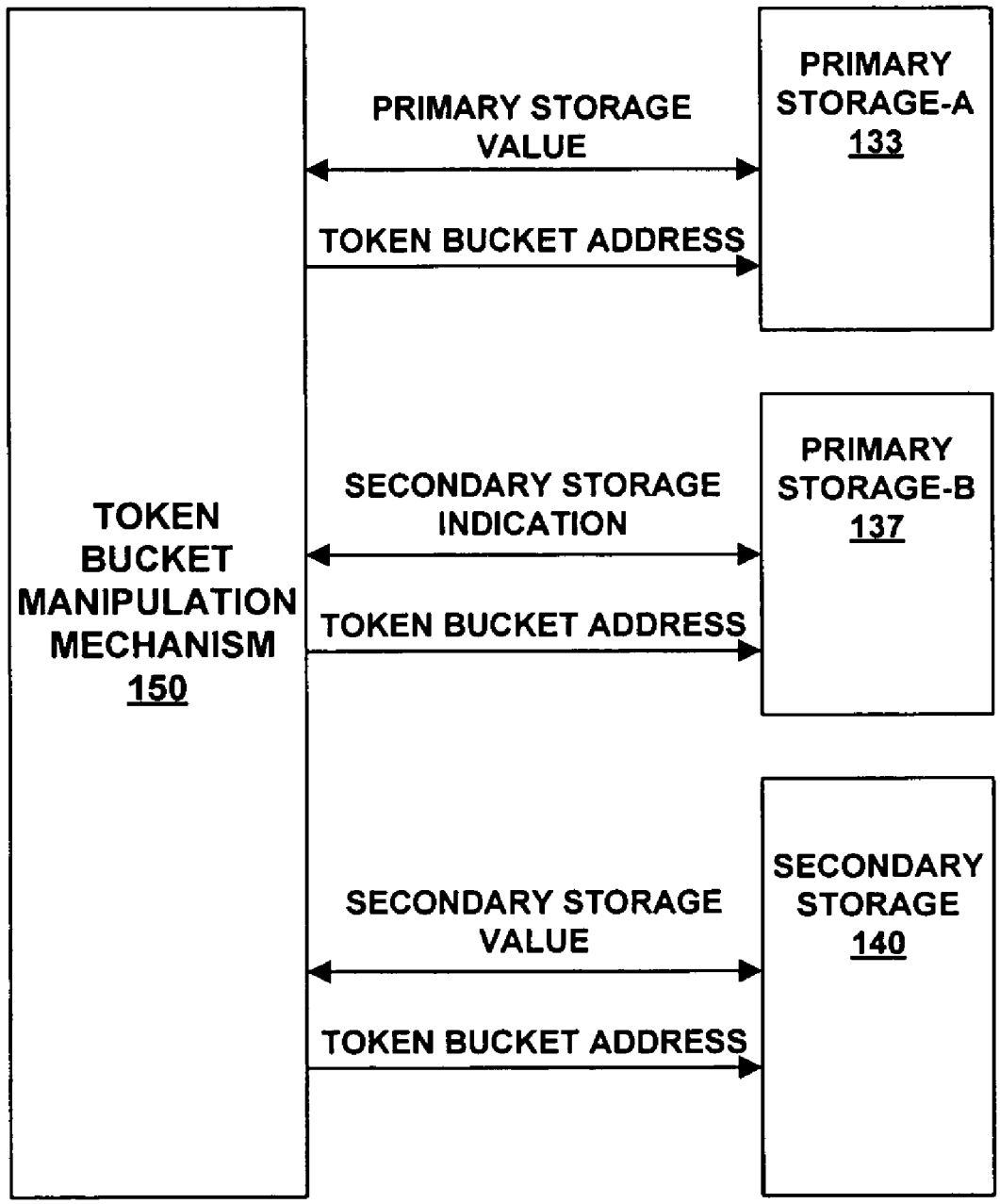

Similarly, FIG. 1D is a block diagram illustrating a token bucket manipulation mechanism 120, which uses primary storages 133 and 137 and secondary storage 140 for maintaining the token buckets. In one embodiment, primary storage 133 is used to store the primary storage value (e.g., a first quantity of tokens), primary storage 137 is used to store the secondary storage value indication, and secondary storage 140 is used to store the secondary storage value (e.g., a second quantity of tokens).

Figure 1E:
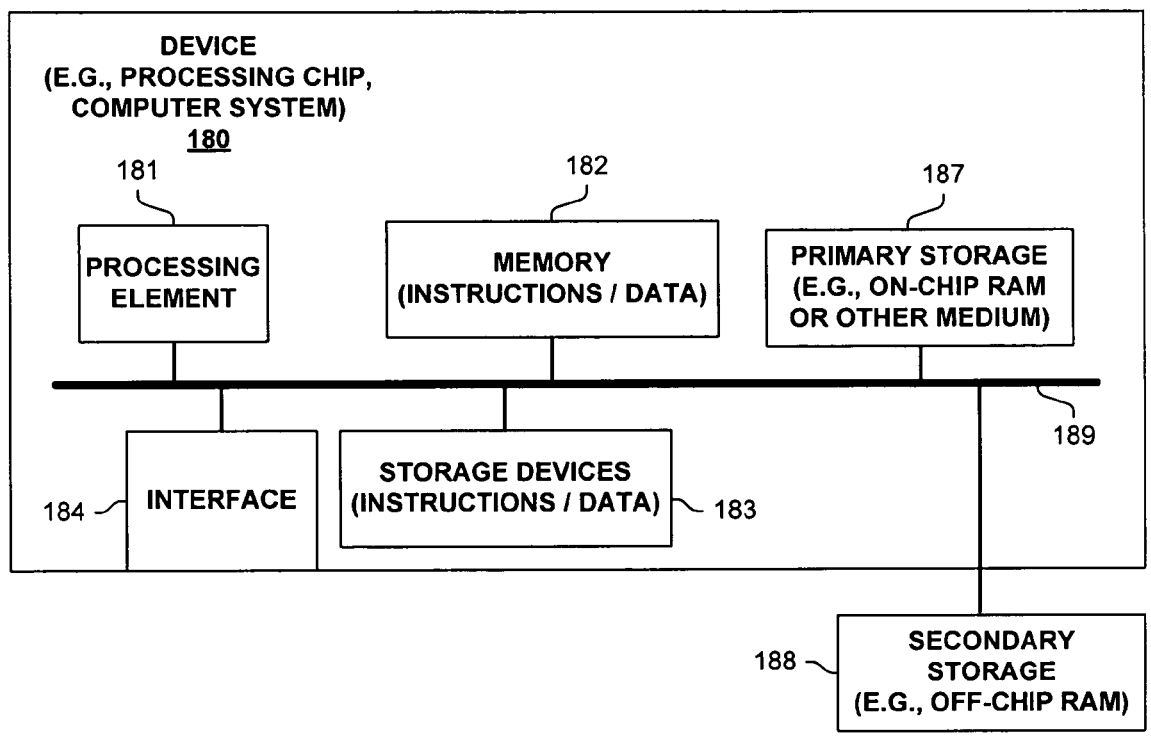

FIG. 1E is a block diagram of a system component 180 (e.g., a token bucket manipulation mechanism, a packet forwarding and token bucket manipulation mechanism, etc.) used in one embodiment for maintaining and using token buckets, wherein the tokens in a token bucket are maintained among a primary storage and one or more secondary storages with an indication reflective of the tokens in the secondary storage(s) for determining eligibility of a corresponding item without having to access the secondary storage(s). In one embodiment, system or component 180 performs one or more processes corresponding to one of the flow diagrams illustrated or otherwise described herein.

In one embodiment, system or component 180 includes a processing element 181, memory 182, storage devices 183, primary storage 187 (which in one embodiment is the same memory as memory 182) for storing primary storage values and secondary storage value indications, an interface 184 for sending and receiving information/data items and/or communicating with external devices (e.g. one or more memories and/or lookup mechanisms), which are typically coupled via one or more communications mechanisms 189, with the communications paths typically tailored to meet the needs of the application. Device 180 communicates with secondary storage 188, external to device 180, for storing secondary storage values. Note, if the system or component 180 is implemented as a chip, its storage devices 183 are typically not internal to the chip.

Various embodiments of component 180 may include more or less elements. The operation of component 180 is typically controlled by processing element 181 using memory 182 and storage devices 183 to perform one or more tasks or processes. Memory 182 is one type of computer-readable medium, and typically comprises random access memory (RAM), read only memory (ROM), flash memory, integrated circuits, and/or other memory components. Memory 182 typically stores computer-executable instructions to be executed by processing element 181 and/or data which is manipulated by processing element 181 for implementing functionality in accordance with an embodiment. Storage devices 183 are another type of computer-readable medium, and typically comprise solid state storage media, disk drives, diskettes, networked services, tape drives, and other storage devices. Storage devices 183 typically store computer-executable instructions to be executed by processing element 181 and/or data which is manipulated by processing element 181 for implementing functionality in accordance with an embodiment.

Figure 2:
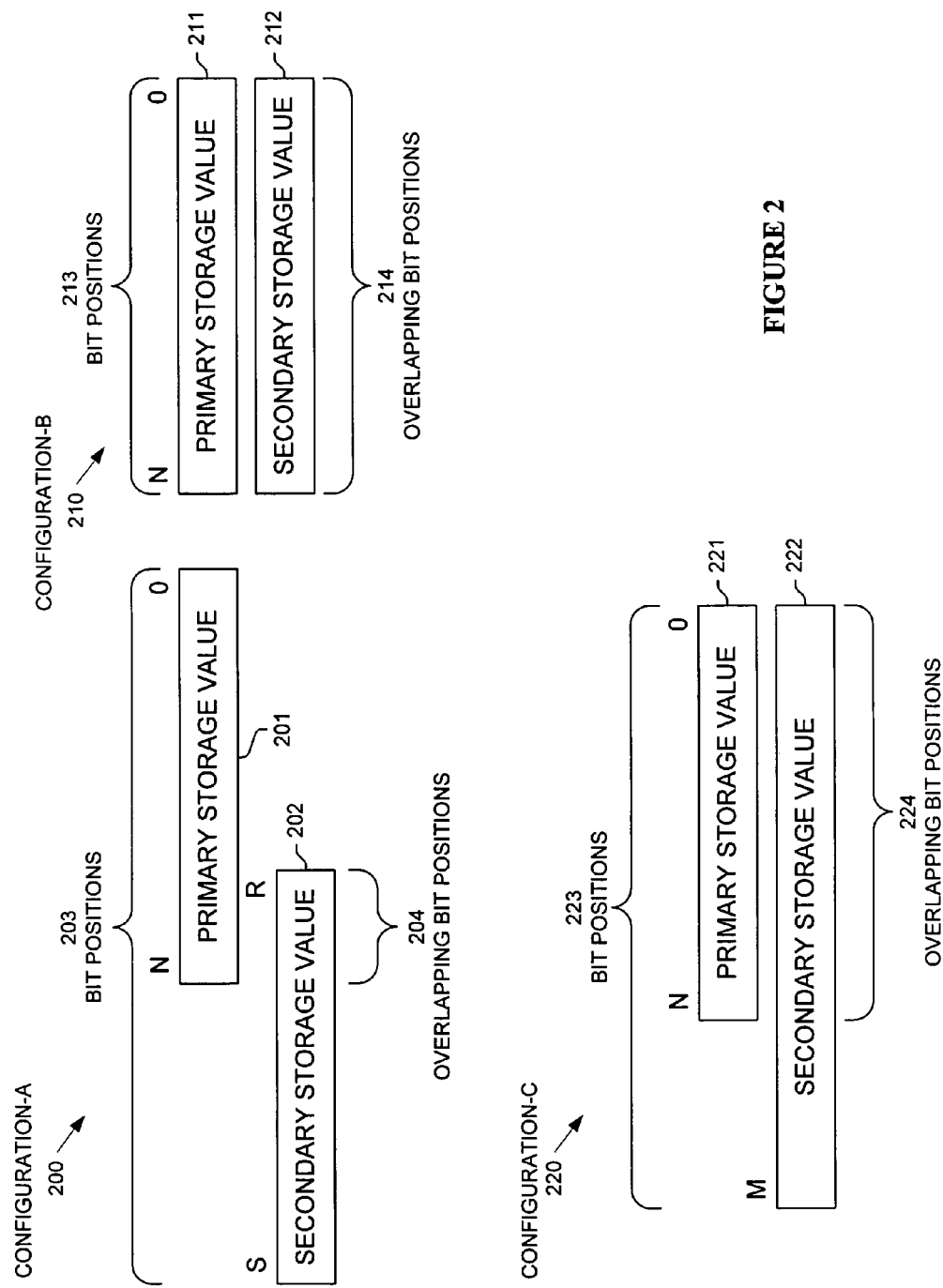
FIG. 2 is a block diagram illustrating a few of an unlimited number of strategies employed in one embodiment for distributing tokens between primary and secondary storage values.

FIG. 2 is a block diagram illustrating a few of an unlimited number of strategies employed in one embodiment for distributing tokens between primary and secondary storage values. Note, one embodiment uses more than one primary and/or secondary storage values, but for ease of understanding the concept by the reader, these examples present a single primary storage value and a single secondary storage value.

The primary and secondary storage values are typically sized to match the amount of memory available on the processing chip as well as the token consumption/addition rates to control the maximum rate at which the secondary storage will need to be accessed. The value or values which are represented by the secondary storage value indication are typically similarly selected in order to readily determine for all or at least some items whether or not an item has enough tokens in its token bucket to be processed without having to retrieve a secondary storage value. In one embodiment, whether or not an item requiring a relatively small number of tokens (e.g., a small packet) has enough tokens in its token bucket can typically be determined based on the primary storage value and/or secondary storage value indication, while whether or not an item requiring a relatively large number of tokens (e.g., a large or MTU packet) has enough tokens in its token bucket might require accessing the secondary storage, especially if the number of tokens required is greater than the number of tokens currently in the primary storage plus the minimum number of tokens represented by the secondary storage indication, or if no secondary storage indication is being used, then especially if the number of tokens required is greater than the number of tokens currently in the primary storage. Note, as tokens are added to and removed from a token bucket, the redistribution of values between the primary and secondary storage might cause tokens to be transferred from the secondary storage to the primary storage, and vice versa. Also, the process or mechanism for redistributing tokens may be implemented in an extensible number of ways, such as directly by the same mechanism that updated one or more values, or via an update mechanism, such as, but not limited to, that illustrated in FIG. 5 and described herein.

As shown in FIG. 2, configuration-A 200 illustrates using a primary storage value 201 consisting of N+1 low-order bits, with secondary storage value 202 including S−R+1 high-order bits, such that there are N−R+1 overlapping bits 204, where N−R+1>0.

The number of tokens in the corresponding token bucket is the sum of primary storage value 201 plus secondary storage value 202 (possibly plus or minus tokens temporarily in an update mechanism or storage). In one embodiment, the number of tokens in the token bucket is redistributed in response to the detection of primary storage value 201 having a bit set in one or more of the overlapping bit positions 204. In one embodiment, the mechanism for performing the token redistribution includes a queue of indications of token buckets awaiting for their redistribution. In one embodiment, whether or not to redistribute the number of tokens is determined based on the result of a comparison operation of the primary storage value and the length of the queue. For example, in one embodiment, an indication of a particular token bucket is added to the queue if it is eligible (e.g., one of the overlapping bits 204 is set) and if the value of the non-overlapping bits of primary storage value 201 is greater than twice the occupancy level of the queue. For example, the redistribution of tokens may be performed to move all or a portion of the tokens represented in overlapping bit positions 204 in primary storage value 201 into secondary storage value 204, or tokens represented in secondary storage value 204 into primary storage value 201 (e.g., by either moving a negative amount of tokens to secondary storage from primary storage and increasing the primary storage by a corresponding amount, or decreasing a number of tokens in the secondary storage and increasing the number of tokens in the primary storage by a corresponding amount). In one embodiment, whether or not to redistribute the number of tokens is determined based on how far the value in the primary storage is from a desired "center point" which balances the likelihood that a periodic update will cause the primary storage value to overflow with the likelihood that packet arrival and concomitant token bucket usage will cause an underflow.

In one embodiment, the secondary storage value indication indicates whether or not any bits are set in secondary storage value 202. In one embodiment, the secondary storage value indication indicates whether or not any bits higher than, but not in, overlapping bit positions 204 are set. In one embodiment, the secondary storage value indication indicates whether or not secondary storage value 202 is at least some other predetermined value. Thus, if the secondary storage value indication indicates that the secondary storage value 202 is zero, then the number of tokens in the token bucket is identified by the quantity of tokens in primary storage value 201 (plus any tokens in the update mechanism for the token bucket), with the primary storage value 201 being used to determine the eligibility of the corresponding item. Also, if the secondary storage value indication indicates that secondary storage value 202 has some bits set or some quantity greater than a predetermined threshold, then the eligibility of the item may be known merely from this secondary storage value indication, or possibly in conjunction the primary storage value 201. In one embodiment, primary storage value 201 can represent positive and non-positive numbers of tokens.

Configuration-B 210 illustrates where primary storage value 211 and secondary storage value 212 can represent the same range of values (e.g., all bit positions 214 overlap), with the range of bit positions 213 being zero to N. Configuration-C 220 illustrates another configuration where primary storage value 221 and secondary storage value 222 overlap for all bit positions 224 of primary storage value 221, while secondary storage value 222 can store a greater number of tokens than primary storage value 221. Thus, it is possible to redistribute a finer granularity of tokens between primary and secondary storage value, such as to decrease the probability of needing to redistribute in the future (e.g., either due to an increase or decrease in the number of tokens in the token bucket). Moreover, these configurations allow the primary storage value to be centered around the midpoint of the range of the primary storage value or an arbitrary number, because any number of tokens can be moved between the primary and secondary storage. Note, this centering-point number for the primary storage value could be changed dynamically, such as but not limited to, in response to packets sizes or the number of tokens in the token bucket.

In one embodiment, no secondary storage value indication is used in conjunction with configurations-B&C (210, 220) as the primary storage values (211, 221) remain as positive values, and if a greater number of tokens is required than indicated by primary storage values (211, 221), then secondary storage values (212, 222) are accessed. In one embodiment, the secondary storage value indication indicates whether or not any bits are set in the corresponding secondary storage value, and thus a determination can be made thereon of whether a read of the secondary storage value (211, 221) will identify a nonzero number of tokens (i.e., if it is zero, then there is no reason to read the secondary storage value to identify zero tokens). In one embodiment, the secondary storage value indication indicates whether or not secondary storage value 202 is at least some predetermined value, so if set, a determination can be made without accessing secondary storage that the aggregate number of tokens is at least the predetermined level plus the number of tokens in the primary storage values (211, 221). In one embodiment, a token bucket is flushed to a queue for redistributing the tokens in the primary and secondary storages when the value of the primary storage value minus the centering point is greater than twice the occupancy level of the redistribution queue. In one embodiment, a token bucket is flushed to a queue for redistributing the tokens in the primary and secondary storages when the absolute value of the primary storage value minus the centering point is greater than twice the occupancy level of the redistribution queue. In one embodiment, this occupancy-level comparison is based upon a scaled version of the absolute value of the distance from the centering point.

Figure 3:
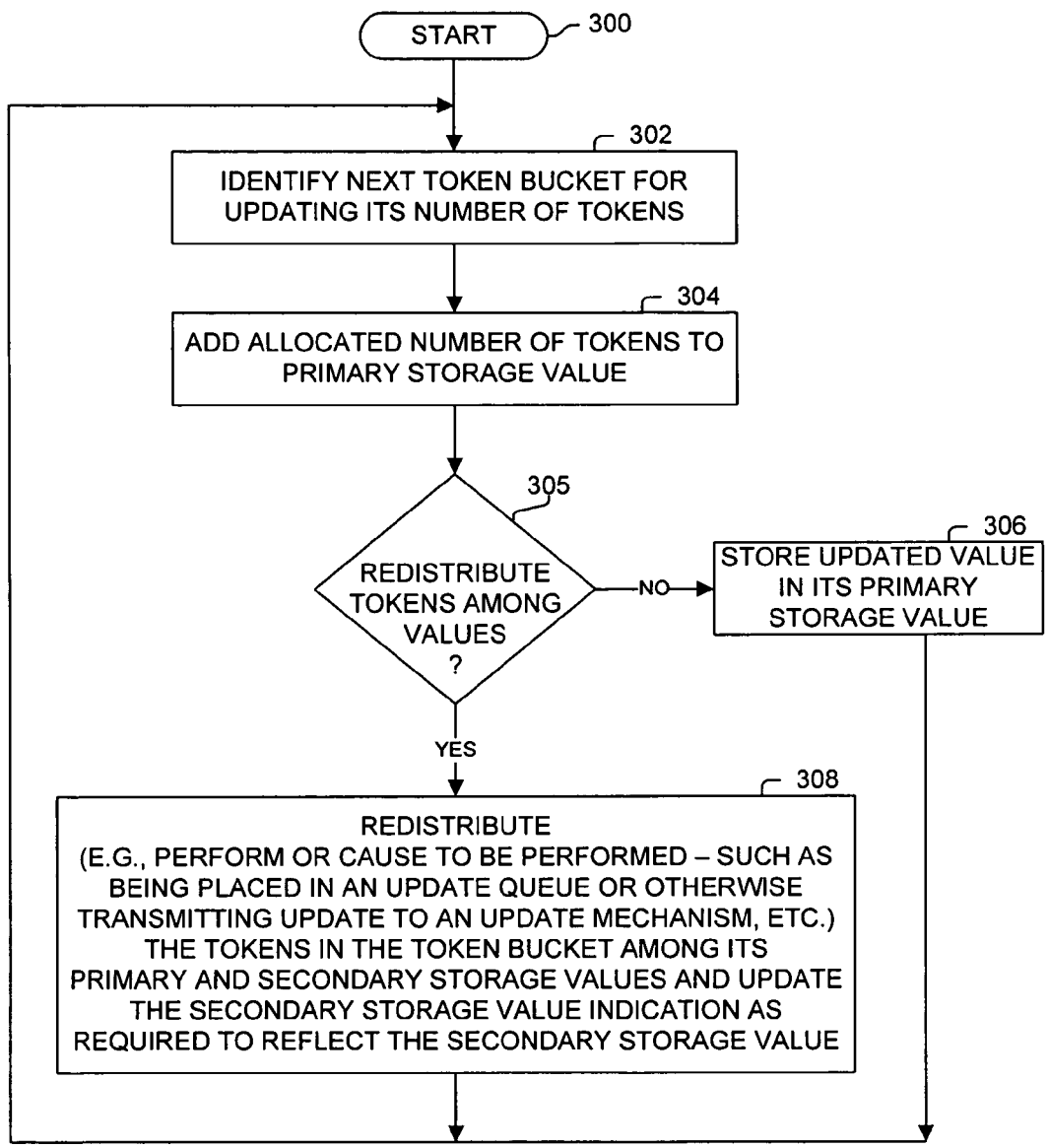
FIG. 3 is a flow diagram illustrating a process used in one embodiment for periodically filling token buckets, including possibly redistributing the tokens between the primary and secondary values of a token bucket.

FIG. 3 is a flow diagram illustrating a process used in one embodiment for periodically filling token buckets, including possibly redistributing the tokens between the primary and secondary values of a token bucket. This periodic filling can be performed in one or more of an unlimited number of ways, such as in a round-robin or calendar-based approach.

Processing begins with process block 300, and proceeds to process block 302, wherein the next token bucket to update is identified. In process block 304, the allocated number of tokens (e.g., the number of tokens to add, or remaining to be added, for this update round) is added to the primary storage value of the token bucket. As determined in process block 305, if the tokens do not need to be redistributed between primary and secondary storage values, then in process block 306, the updated value is stored in the primary storage value. Otherwise, in process block 308, the tokens are redistributed (either immediately or caused to be redistributed such as by placing in a queue for redistributing by an update mechanism) between the primary and secondary storage values, and the secondary storage value indication (if one is used in this embodiment) is accordingly updated. Processing returns to process block 302 to update the next token bucket.

The determination of when to redistribute tokens, as well as the redistribution mechanism used, is typically dependent on the embodiment, and based on criteria such as the values represented by the primary and secondary storage values (such as those illustrated in FIG. 2) and update and token depletion rates.

Also, one embodiment uses this same redistribution mechanism recursively and/or for multiple levels. In other words, there might be a tertiary storage (and possibly more storage levels), where the redistribution of tokens between two subsequent levels (e.g., between the secondary storage and the tertiary storage) is performed in a manner similar to that of between the primary and secondary storage as described herein.

Figure 4A:
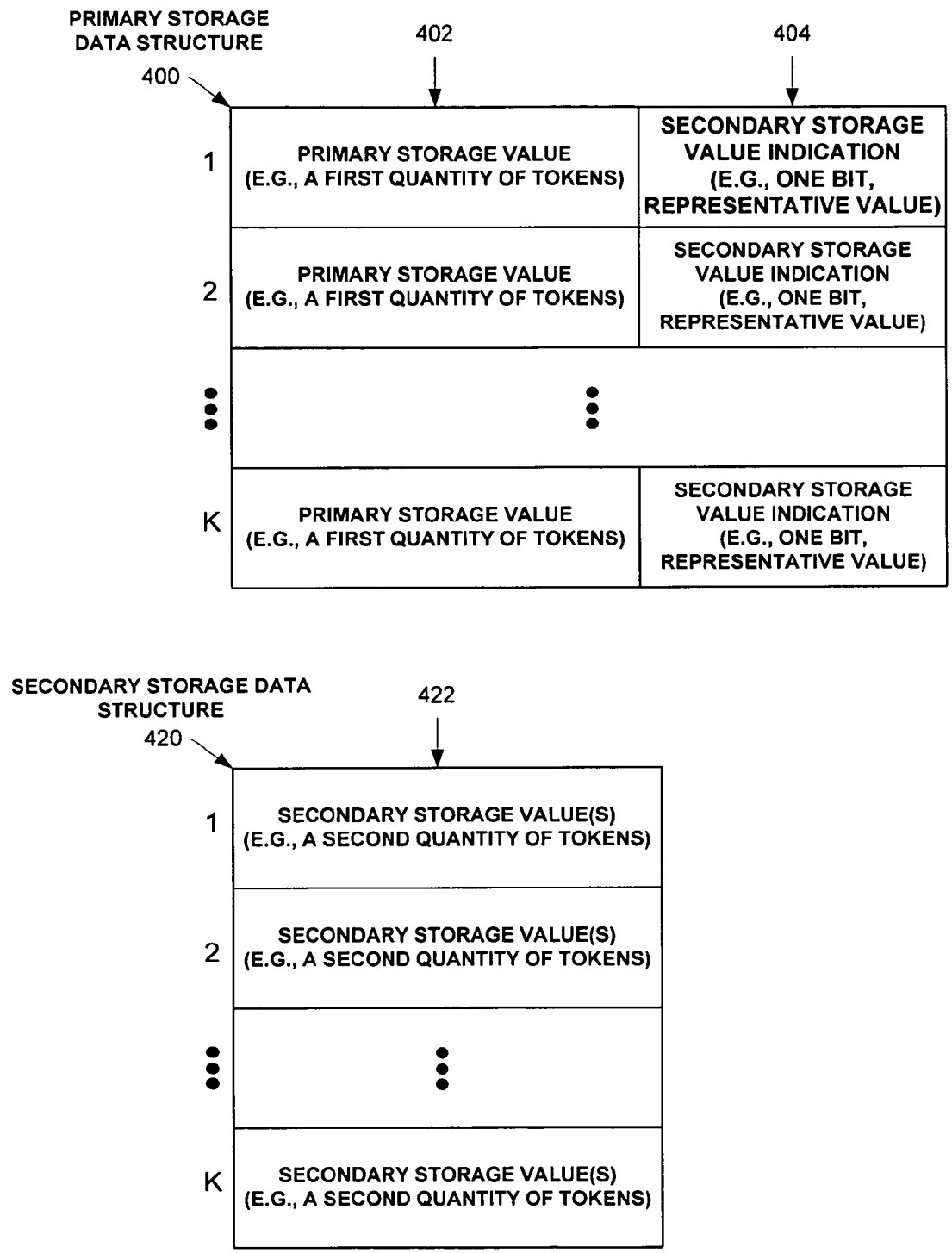
FIG. 4A is a block diagram of a couple of data structures used in one embodiment for storing primary storage values and secondary storage value indications, and secondary storage values.

FIG. 4A is a block diagram of a couple of data structures (400, 420) used in one embodiment for storing primary storage values and secondary storage value indications, and secondary storage values. As shown, primary storage data structure 400 includes, for each of K token buckets, storage for its primary storage value 402 and secondary storage value indication 404. As shown, in one embodiment, the primary storage value 402 and the secondary storage value indication 404 for a token bucket are stored in a manner such that they can be retrieved by a single read operation on a memory or other computer-readable medium. Secondary storage data structure 420 includes, for each of K token buckets, storage for its secondary storage value 422. Of course, these data structures (400, 420) are merely illustrative and not limiting. For example, one embodiment stores the secondary storage value indication 404 in a separate memory or other computer-readable medium separate from that of the primary storage values 402. Also, one embodiment stores these values and/or indications in multiple or cascaded memories or cache memories.

Figure 4B:
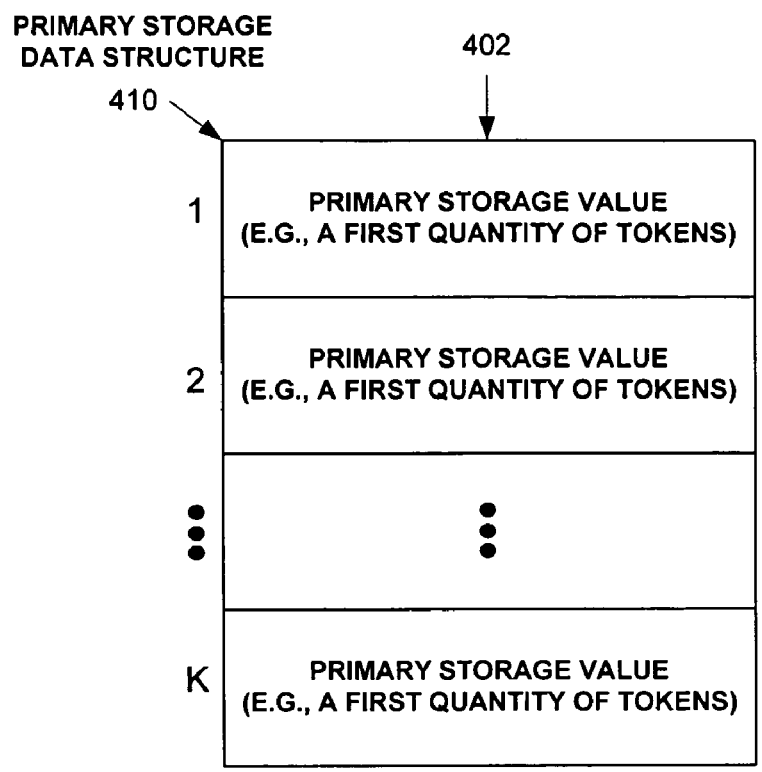
FIG. 4B is a block diagram of a couple of data structures used in one embodiment for storing primary storage values and secondary storage values.
Figure 4B:
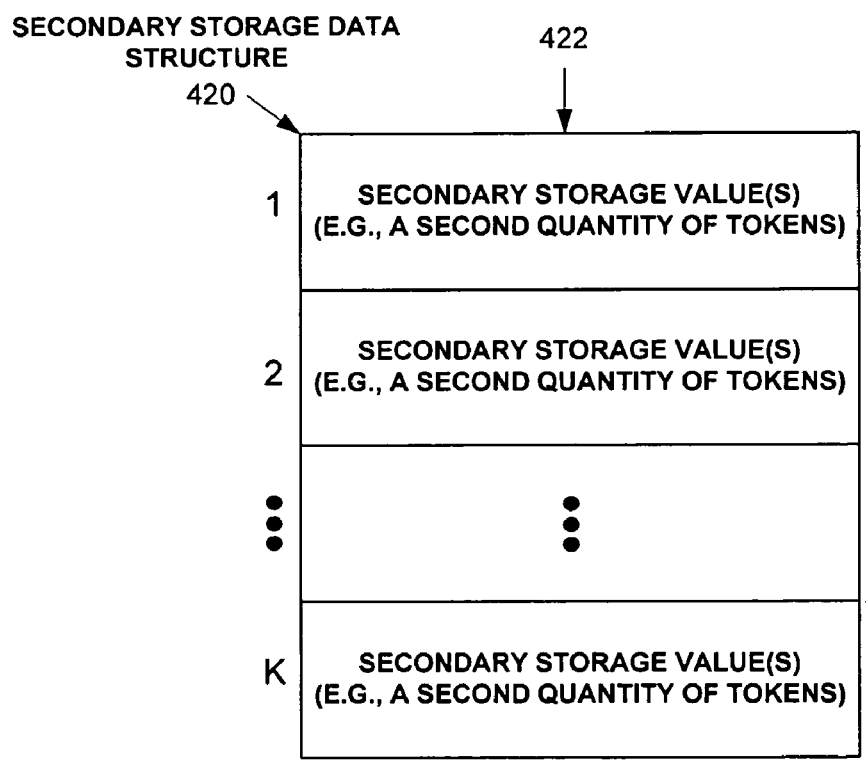

The data structures illustrated in FIG. 4B is used in one embodiment. These data structures are similar to those illustrated in FIG. 4A, with a difference being that data structure 410 includes primary storage values 402, but does not include any secondary storage value indications.

Figure 4C:
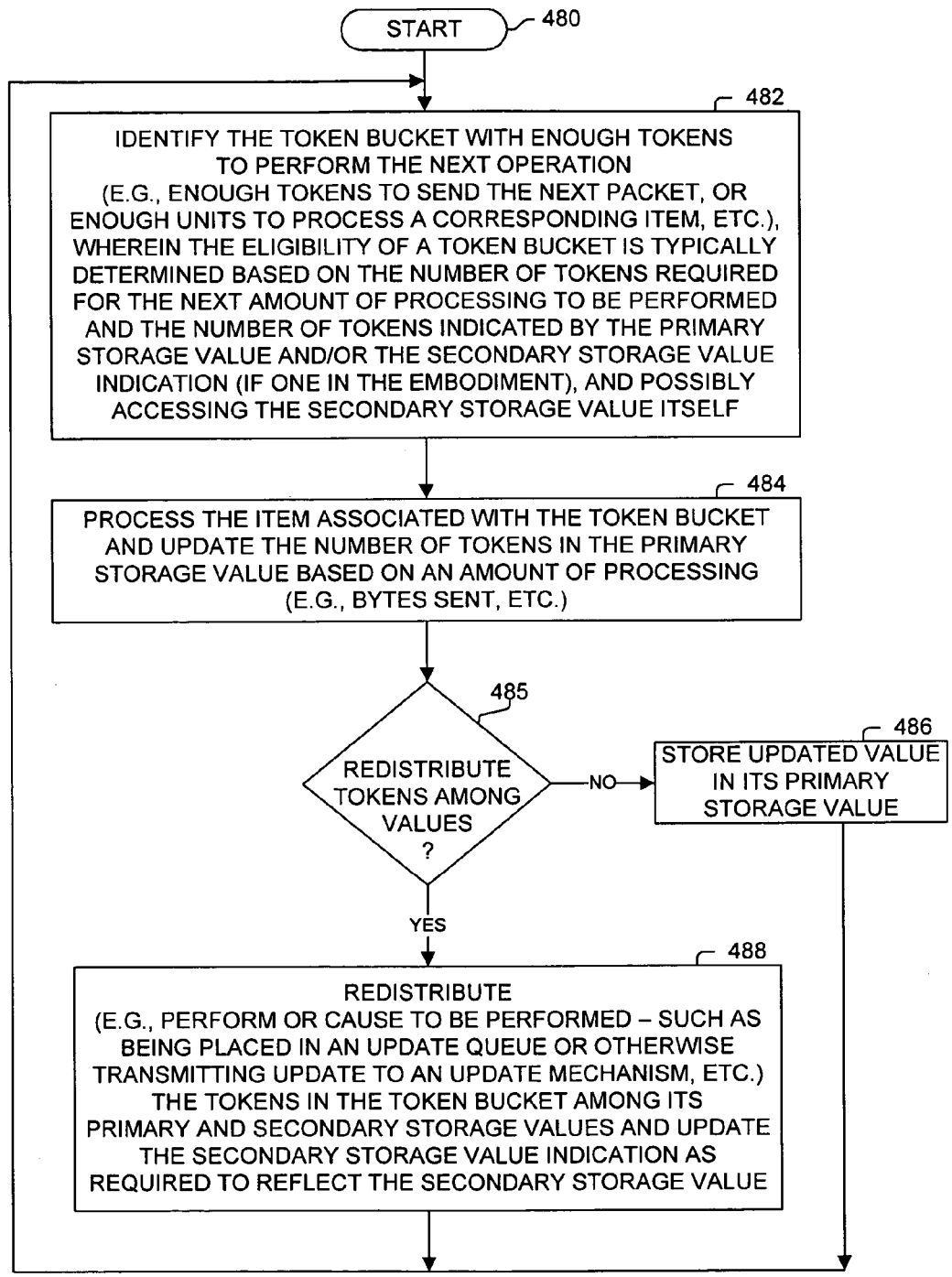
FIG. 4C is a flow diagram illustrating a process used in one embodiment for identifying an eligible item, and updating the number of tokens in its token bucket in accordance with processing of the item which may include redistributing the tokens between the primary and secondary values of the token bucket.

FIG. 4C is a flow diagram illustrating a process used in one embodiment for identifying an eligible item based on its corresponding primary storage value and secondary storage value indication and updating the number of tokens in its token bucket in accordance with processing of the item, including possibly redistributing the tokens between the primary and secondary values of a token bucket.

Processing begins with process block 480, and proceeds to process block 482, wherein the next eligible item to process is identified. Whether or not an item is eligible for processing is identified based on its primary storage value and/or secondary storage value indication (if one is used in the embodiment), possibly compared to the amount of processing required for the item. In one embodiment, the actual secondary storage value may also need to be retrieved for determining the eligibility of the token bucket, especially for a large amount of required processing (e.g., for a large packet). In process block 484, the item is processed (or this processing initiated) and the quantity of tokens in the primary storage value is updated based on the amount of processing (e.g., reduced by the number of bytes of the packet, etc.) and possibly increased by a number of tokens corresponding to a portion of the current token update cycle. By adding the proportional rate of tokens and subtracting the amount of processing in this manner, the value in the primary storage may remain relatively constant and/or may remain at a level wherein it does not require a redistribution of tokens between the primary and secondary storages and/or decrease the rate at which a token bucket requires redistribution of its tokens (of course, this depends on the rates at which tokens are being added and subtracted).

As determined in process block 485, if the tokens do not need to be redistributed between primary and secondary storage values, then in process block 486, the updated value is stored in the primary storage value. Otherwise, in process block 488, the tokens are redistributed (either immediately or caused to be redistributed such as by placing in a queue for redistributing by an update mechanism) between the primary and secondary storage values, and the secondary storage value indication is accordingly updated. Processing returns to process block 482 to identify and process the next item.

Figure 5A:
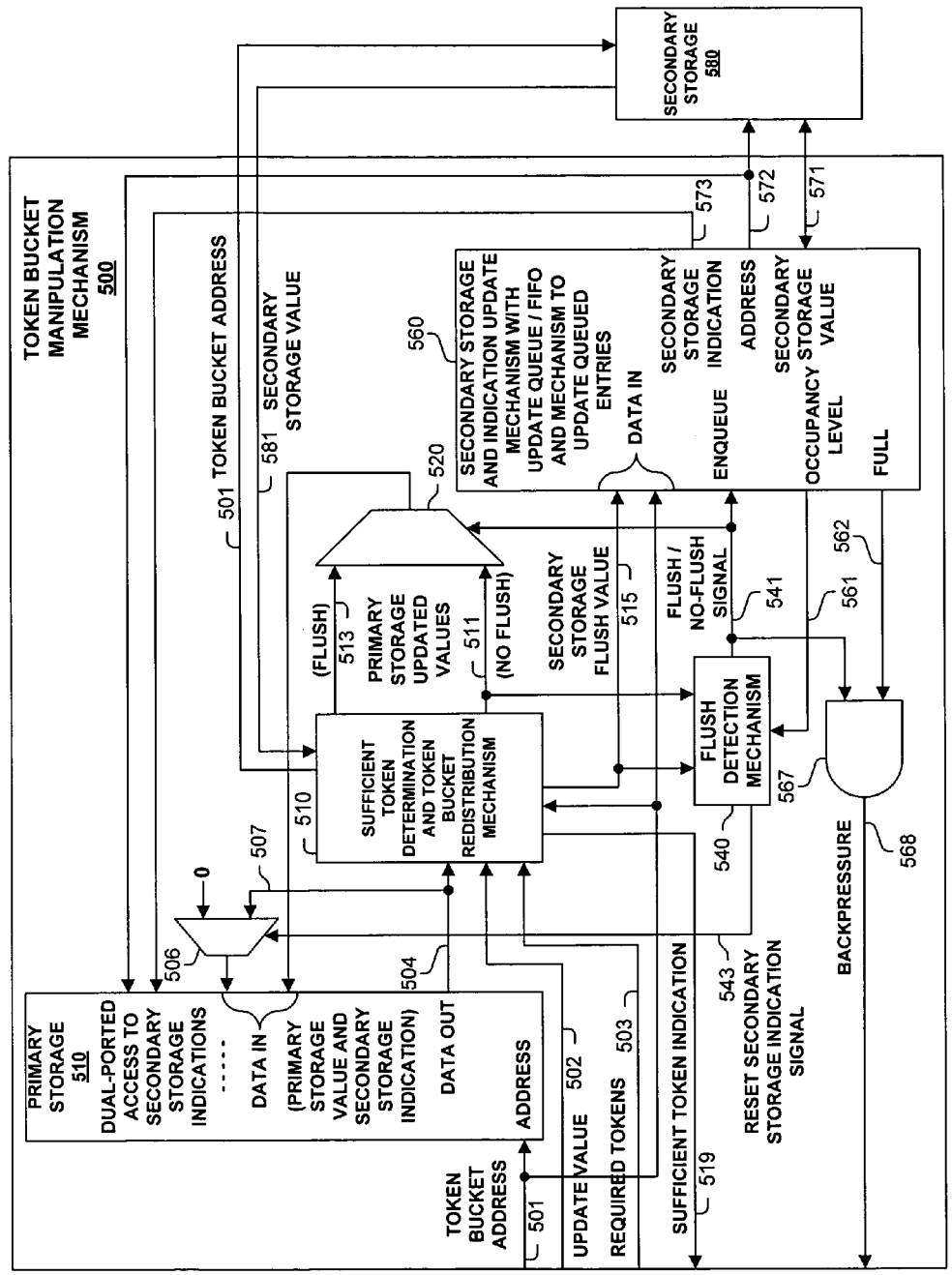
FIG. 5A is a block diagram of a circuit used in one embodiment for updating tokens stored in primary and secondary storages and for updating the secondary storage value indications.

FIG. 5A is a block diagram of a circuit used in one embodiment for redistributing tokens stored in primary and secondary storages and for updating the secondary storage value indications. Note, the terms flush and redistribute are used interchangeably herein. Also, one embodiment does not used secondary storage indications, and therefore, this circuitry/operations are removed from that illustrated in FIG. 5.

As shown, the token bucket address 501, update value 502 (e.g., the number of tokens to add or subtract), and the number of required tokens 503 (e.g., corresponding to an amount of processing or zero for a fill operation) are received. Update value 502 could also be a predetermined value, such as that generated based on token bucket address 501 (e.g., for a periodic fill), or generated by any other mechanism. The current values 504 of the primary storage value and secondary storage value indication for the token bucket being updated is retrieved from primary storage 509 based on the received token bucket address 501. In one embodiment, primary storage 509 is dual ported so the primary storage value and/or the secondary storage value indications can be updated while other memory operations are being performed. In one embodiment, the primary storage values and the secondary storage values are stored in different memories or other computer-readable media, such as that illustrated by FIG. 1D.

Sufficient token determination and token bucket redistribution mechanism 510, based on current values 504 of the primary storage value and secondary storage value indication and the required number of tokens 503, identifies whether or not there are a sufficient number of tokens for performing the operation with this result identified by indication 519. In one embodiment, mechanism 510 may also retrieve the secondary storage value 581 from secondary storage 580 in making this determination (e.g., for the case of a large amount of processing or packet). Based on indication 519, the processing of the item associated with the token bucket can be performed (e.g., packet sent) or not performed (packet delayed or dropped).

If the primary storage value (read as part of 504) is to be updated based on update value 502, then mechanism 510 generates the new primary storage value 511 for the case where tokens are not going to be redistributed, and new primary storage value 513 and secondary storage flush value 515 for the case where tokens are going to be redistributed.

Flush detection mechanism 540 determines, typically based on updated value 511 and an indication of an occupancy level 561 of the redistribution queue within secondary storage and indication update mechanism 560, whether the tokens should be redistributed, and generates flush/no-flush signal 541 accordingly. Based on flush/no-flush signal, selector 520 selects the appropriate updated primary storage value 511 or 513. If a flush operation is identified, then mechanism 560 performs an enqueue operation, initiated by flush/no-flush signal 541, to place secondary storage flush value 515 and the token bucket address 501 in the redistribution queue. Note, if the queue becomes full, signal 562 is asserted. Additionally, in one embodiment, backpressure signal 568 is generated by backpressure signal generator 567 (e.g., an AND operation in one embodiment) typically based on queue full indication 562 and flush/no-flush signal 541. Typically, backpressure signal 568 indicates that the packet processor or other mechanism needs to be stalled when the redistribution queue in mechanism 560 is full and a secondary storage update is to be added to it.

Also, flush detection mechanism determines, typically based on secondary storage flush value 515, and generates signal 540 causing selector 506 to select between the previous secondary storage value indication (507) or whether to force it to be reset. The new values of the primary storage value and the secondary storage value indication are then stored in primary storage 509. Note, in one embodiment, the secondary storage indication is reset if a negative value is being flushed to secondary storage 580 which might cause the secondary storage value indication to be reset after the flush operation is complete. In one embodiment, selector 506 also includes a set-bit input such that the secondary storage value indication can be forced to be set, such as when a positive number of tokens is being flushed that guarantees the secondary storage indication will be set after the flush operation is complete. In one embodiment, the secondary storage indication includes an additional state bit to identify whether or not a flush operation is queued for processing.

In parallel, mechanism 560, in response to having a secondary storage update in its redistribution queue, retrieves an update, performs a read-modify-write on the corresponding secondary storage value (571) stored in secondary storage 580 (at the address 572 of the corresponding token bucket) to update the secondary storage value (571) based on the secondary storage update. Mechanism 560 also determines the new secondary storage value indication (573) which is provided to primary storage 509 to update the corresponding secondary storage value indication (at the address 572 of the corresponding token bucket).

Of course, embodiments may use different addresses, such as, but not limited to, different address offsets within primary storage 509 and secondary storage 580. Also, token bucket manipulation mechanism 500 may be for maintaining multiple sets of token buckets.

Figure 5B:
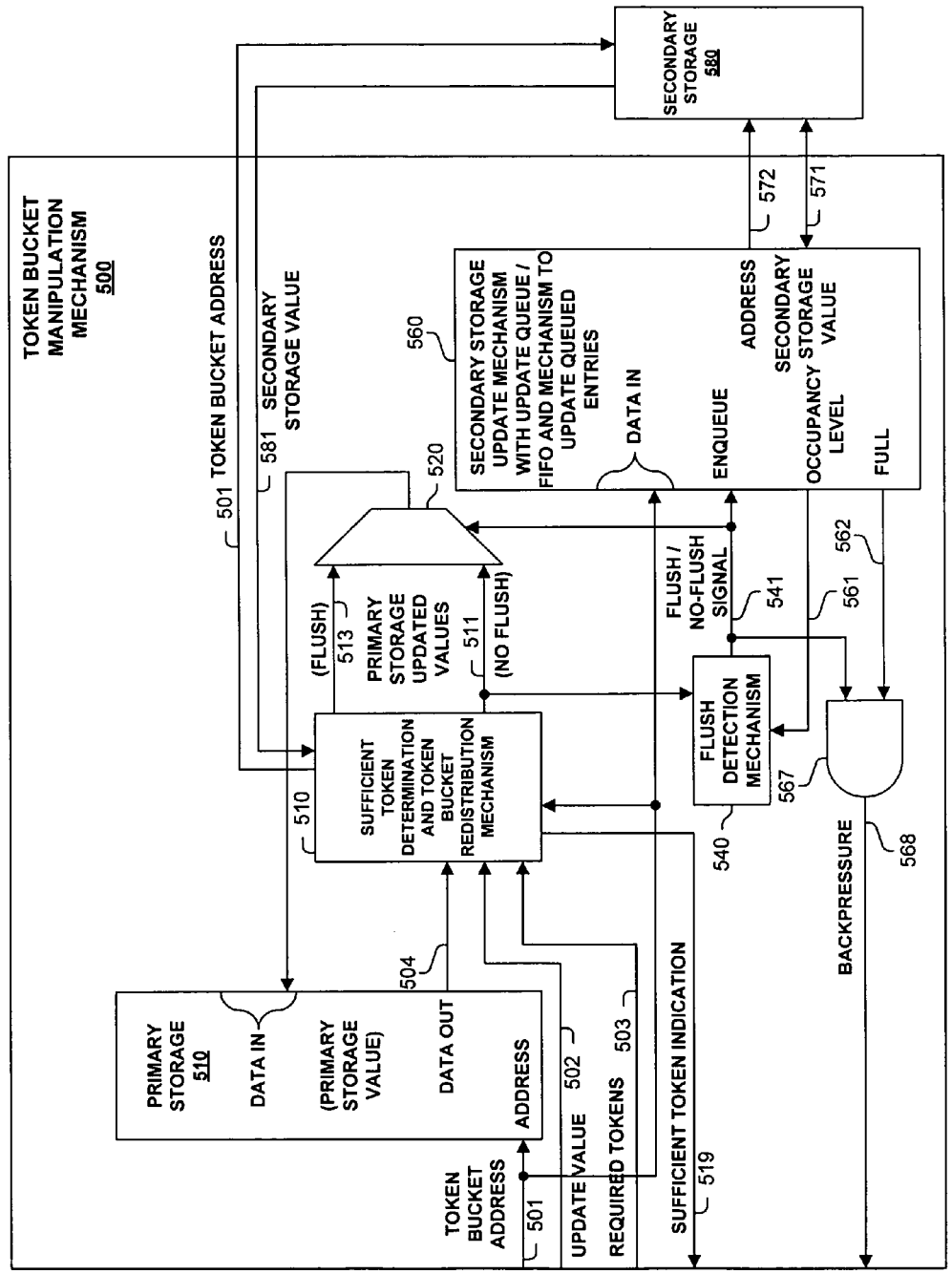
FIG. 5B is a block diagram of a circuit used in one embodiment for updating tokens stored in primary and secondary storages.

FIG. 5B is a block diagram of a token bucket manipulation mechanism 500B used in one embodiment for updating tokens stored in primary and secondary storages. Mechanism 500B operates in a manner similar to mechanism 500 (FIG. 5A), with the illustrated difference between FIGS. 5A and 5B being that FIG. 5B does not include the use of secondary storage indications. Therefore, these corresponding secondary storage features/functions illustrated in FIG. 5A are not shown in FIG. 5B, and mechanisms 509B, 510B, 540B, and 560B operate as described herein in a similar manner to that shown in FIG. 5A, but without reference to secondary storage indications.

In view of the many possible embodiments to which the principles of our invention may be applied, it will be appreciated that the embodiments and aspects thereof described herein with respect to the drawings/figures are only illustrative and should not be taken as limiting the scope of the invention. For example and as would be apparent to one skilled in the art, many of the process block operations can be re-ordered to be performed before, after, or substantially concurrent with other operations. Also, many different forms of data structures could be used in various embodiments. The invention as described herein contemplates all such embodiments as may come within the scope of the following claims and equivalents thereof.

What is claimed is:

1. A method for maintaining a particular number of tokens in a token bucket for use in processing items by a particular machine, the particular number of tokens being stored among a plurality of different storages, said storages including a primary storage and a secondary storage, the primary storage including a primary storage token value, the secondary storage including a secondary storage token value, the particular number of tokens including the primary storage token value plus the secondary storage token value, the method comprising:

identifying, by the particular machine, that the particular number of tokens is sufficient to process a first item of said items without accessing the secondary storage token value; and adjusting, by the particular machine, the particular number of tokens by modifying the primary storage token value and not accessing the secondary storage token value, said modifying the primary storage token value includes adjusting the primary storage token value by an amount corresponding to the tokens required to process the first item.

2. The method of claim 1, comprising:

identifying, by the particular machine, that the particular number of tokens is sufficient to process a second item of said items; and updating, by the particular machine, the particular number of tokens by changing both the primary storage token value and the secondary storage token value, said changing including reading and summing the current values of both the primary storage token value and the secondary storage token value and adjusting by an amount corresponding to the tokens required to process the second item, and redistributing the number of tokens in the token bucket among the plurality of different storages, said redistributing including storing values in both the primary storage token value and the secondary storage token value.

3. The method of claim 2, wherein the said redistributing causes a smaller value to be stored in the secondary storage token value than said current value read from the secondary storage token value as part of the same said update operation as said redistributing operation.

4. The method of claim 2, wherein the resulting said number of tokens currently in the token bucket after said update operation is the sum of values stored in the primary storage token value and the secondary storage token value.

5. The method of claim 2, wherein the secondary storage includes all plus at least one more bit positions of the primary storage.

6. The method of claim 2, wherein said redistributing operation centers the number of tokens stored in the primary storage token value.

7. The method of claim 1, wherein the secondary storage includes all plus at least one more bit positions of the primary storage.

8. The method of claim 1, wherein the primary storage includes a secondary storage indication reflecting a current number of tokens in the secondary storage token value; and wherein said identifying that the particular number of tokens is sufficient to process the first item of said items includes accessing the secondary storage indication.

9. An apparatus, comprising:
a first device configured to process items according to a number of tokens in a token bucket and to update the number of tokens in the token bucket, the first device including a primary storage, the primary storage including a primary storage value representing a first quantity of the number of tokens; and
a secondary storage, communicatively coupled to the first device and external to the first device, the secondary storage including a secondary storage value representing a second quantity of the number of tokens;
wherein the number of tokens in the token bucket is represented by an aggregation of quantities of tokens, said quantities of tokens including the first quantity of the number of tokens and the second quantity of the number of tokens; and wherein the first device is configured to maintain a secondary storage value indication representative of the second quantity of the number of tokens such that the first device can identify without accessing the secondary storage value and based on the primary storage value and the secondary storage value indication whether or not the number of tokens is sufficient to process a next item of said items.

10. The apparatus of claim 9, wherein the secondary storage value indication consists of one bit.

11. The apparatus of claim 10, wherein said bit is in a first state for indicating that the secondary storage value is zero and in a second state for indicating that the secondary storage value is not zero.

12. The apparatus of claim 10, wherein said bit is in a first state for indicating that the secondary storage value is at least a predetermined value greater than zero and in a second state for indicating that the secondary storage value is not at least the predetermined value.

13. The apparatus of claim 9, wherein the number of tokens is equal to the sum of the first quantity of the number of tokens and the second quantity of the number of tokens.

14. The apparatus of claim 9, wherein said updating the number of tokens in the token bucket includes distributing the number of tokens in the token bucket to the first and second quantities of the number of tokens.

15. The apparatus of claim 14, wherein said distributing the number of tokens includes increasing by a particular number of tokens the number of tokens in the first quantity of the number of tokens and decreasing by the particular number of tokens in the second quantity of the number of tokens.

16. The apparatus of claim 9, wherein said updating the number of tokens in the token bucket includes: flushing an indication of the token bucket into an update queue; and subsequently to said flushing operation: identifying said queued indication as being ready to process, and in response to said identified queued indication, updating the second quantity of the number of tokens.

17. The apparatus of claim 16, wherein further in response to said identified queued indication, updating the secondary storage value indication to reflect said updated second quantity of the number of tokens.

18. The apparatus of claim 16, wherein said queued indication includes a third quantity of the number of tokens; and wherein said quantities of tokens includes the third quantity of the number of tokens.

19. The apparatus of claim 9, wherein a current value of the primary storage value is a negative number.

20. The apparatus of claim 19, wherein the first device is configured to identify that number of tokens is sufficient to process a next item of said items based on the secondary storage value indication even though the primary storage value is a negative number.

21. An apparatus, comprising:
a first device configured to process items according to a number of tokens in a token bucket and to update the number of tokens in the token bucket, the first device including a primary storage, the primary storage including a primary storage value representing a first quantity of the number of tokens; and
a secondary storage, communicatively coupled to the first device and external to the first device, the secondary storage including a secondary storage value representing a second quantity of the number of tokens;
wherein the first device is configured to maintain a secondary storage value indication representative of the second quantity of the number of tokens such that the first device can identify without accessing the secondary storage value and based on the secondary storage value indication whether or not the number of tokens is sufficient to process a next item of said items; wherein the secondary storage value indication consists of one bit; and wherein said bit is in a first state for indicating that the secondary storage value is at least a predetermined value greater than zero and in a second state for indicating that the secondary storage value is not at least the predetermined value.

22. A method for forwarding packets based on token buckets, the method comprising:
employing a particular machine to perform the following steps:
identifying a packet to be sent, said identified packet associated with a corresponding token bucket of a plurality of token buckets; wherein a number of tokens within each particular token bucket of the plurality of token buckets is distributed between multiple storage locations, including a first value stored in a primary storage and a second value stored in a secondary storage; wherein a packet is eligible to be sent if the number of tokens within its corresponding said token bucket contains enough tokens to send the packet associated therewith;

determining a new number of tokens for the corresponding token bucket, said determining including decreasing the corresponding token bucket by an amount corresponding to said identified packet; and updating at least the first value associated with said token bucket corresponding to said identified packet based on the new number of tokens.

23. The method of claim 22, wherein each particular token bucket of the plurality of token buckets is further associated with a secondary storage indication of whether or not its said corresponding second value currently has a value larger than or at least as large as a predetermined value greater than zero; and wherein said identifying the packet includes referencing its corresponding said secondary storage indication.

24. The method of claim 23, wherein said identifying the packet does not reference the second value.

25. The method of claim 23, wherein said first value is a signed value for identifying a value with a range of possible values including a negative, zero, or positive number.

26. The method of claim 23, wherein said first and second values for each of the plurality of token buckets each include a plurality of bits to represent their respective values with at least one overlapping bit; wherein two bits overlap if their positions represent the same power of two.

27. The method of claim 22, wherein the second value includes all plus at least one more bit positions of the first value.

28. The method of claim 22, wherein the primary storage and the secondary storage are on different computer chips.

29. An apparatus for forwarding packets based on token buckets, the apparatus comprising:

a secondary storage device; and a token bucket manipulation mechanism, the token bucket manipulation including: primary storage; means for determining a new number of tokens for a token bucket corresponding to an identified eligible packet, said identified eligible packet associated with a corresponding token bucket, wherein a number of tokens within the corresponding token bucket is distributed between the secondary storage device and the primary storage, with a first value of tokens of the corresponding token bucket in the primary storage and a second value of tokens of the corresponding token bucket in the secondary storage device, and wherein said identified eligible packet was determined to be eligible because the corresponding token bucket contains enough tokens to send said identified eligible packet; and means for updating at least the first value associated with said token bucket corresponding to said identified eligible packet based on the new number of tokens.

30. The apparatus of claim 29, wherein said token bucket corresponding to said identified eligible packet is further associated with a secondary storage indication maintained in said primary storage; wherein the secondary storage indication indicates whether or not its said corresponding second value currently has a value larger than or at least as large as a predetermined value greater than zero; and wherein identified eligible packet was determined to be eligible based on referencing the secondary storage indication.

31. The apparatus of claim 30, wherein said identified eligible packet was determined to be eligible without referencing the second value.

* * * * *

UNITED STATES PATENT AND TRADEMARK OFFICE
CERTIFICATE OF CORRECTION

PATENT NO. : 7,599,287 B2  Page 1 of 1
APPLICATION NO. : 11/271247
DATED : October 6, 2009
INVENTOR(S) : Testa et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 999 days.

Signed and Sealed this

Twenty-eighth Day of September, 2010

David J. Kappos
*Director of the United States Patent and Trademark Office*